US008908609B1

(12) United States Patent
Naden et al.

(10) Patent No.: US 8,908,609 B1
(45) Date of Patent: Dec. 9, 2014

(54) MULTI-HOP WIRELESS COMMUNICATIONS SYSTEM AND METHOD (75) Inventors: James M Naden, Hertford (GB); Fiona Wilson, Spellbrook (GB)

(73) Assignee: Rockstar Consortium US LP, Plano, TX (US)

( * ) Notice: Subject to any disclaimer, the term of this patent is extended or adjusted under 35 U.S.C. 154(b) by 1598 days.

(21) Appl. No.: 10/968,518

(22) Filed: Oct. 19, 2004

Related U.S. Application Data (63) Continuation-in-part of application No. 10/456,249, filed on Jun. 6, 2003, now Pat. No. 7,184,703.

(51) Int. Cl.
*H04W 4/00* (2009.01)
(52) U.S. Cl.
USPC ......... 370/329; 455/436; 455/439; 455/452.2
(58) Field of Classification Search
USPC ......... 370/329, 311; 455/445, 11.1, 572–574, 455/69, 522, 436, 439, 452.2
See application file for complete search history.

(56) References Cited

U.S. PATENT DOCUMENTS

| | | | | |
|---|---|---|---|---|
| 5,152,002 A * | 9/1992 | Leslie et al. | ............... | 455/422.1 |
| 6,108,561 A * | 8/2000 | Mallinckrodt | ............... | 455/522 |
| 6,603,971 B1 * | 8/2003 | Mohebbi | ............... | 455/437 |
| 6,748,233 B1 * | 6/2004 | Arnold et al. | ............... | 455/522 |
| 6,898,430 B1 * | 5/2005 | Liberti et al. | ............... | 455/445 |
| 7,031,293 B1 * | 4/2006 | Srikrishna et al. | ............... | 370/348 |
| 7,480,486 B1 * | 1/2009 | Oh et al. | ............... | 455/7 |
| 7,529,525 B1 * | 5/2009 | Hovers et al. | ............... | 342/372 |
| 2005/0059342 A1 * | 3/2005 | Engels et al. | ............... | 455/7 |

* cited by examiner

*Primary Examiner* — Amancio Gonzalez
(74) *Attorney, Agent, or Firm* — Christopher & Weisberg, P.A.

(57) ABSTRACT

A multi-hop wireless, for example cellular, communications system is provided comprising a source equipment which may be one of a base station or an end user terminal for transmitting signals towards a destination equipment which may be the other of a base station or an end user terminal via at least one relay equipment. The relay equipment receives a plurality of signals transmitted from one or more source equipments of the system and from this plurality of signals selects a signal to relay. In this way the decision about which relays are included in which communication paths in the system is distributed to the relay equipments of the system, thus reducing the signalling overhead as compared with link state protocols which are typically used for routing in such multi-hop systems.

21 Claims, 7 Drawing Sheets

MULTI-HOP WIRELESS COMMUNICATIONS SYSTEM AND METHOD

CROSS-REFERENCE TO RELATED APPLICATION

This application is a continuation-in-part of Utility patent application Ser. No. 10/456,249, filed Jun. 6, 2003, now U.S. Pat. No. 7,184,703, entitled MULTI-HOP WIRELESS COMMUNICATIONS SYSTEM HAVING RELAY EQUIPMENTS WHICH SELECT SIGNALS TO FORWARD.

FIELD OF THE INVENTION

This invention relates to a multi-hop wireless communications system, in particular a multi-hop wireless cellular communications system, in which a source equipment and a destination equipment, for example an end user terminal and a servicing base station, may communicate with each other via at least one relay equipment. This invention also relates to a method in a multi-hop, in particular cellular, wireless communications system for directing communications between a source equipment and a destination equipment via at least one relay equipment.

BACKGROUND OF THE INVENTION

A geographical area covered by a cellular wireless communications system may be separated into a patchwork of smaller geographical areas or cells, which are each served by a servicing base station. Each base station communicates with end user terminals, which are located within the cell served by the base station. In a conventional cellular wireless communication system, an end user terminal, which may be a mobile or a stationary end user terminal, attempts to communicate directly with a servicing base station, with no other terminals being involved. Some of the end user terminals may be located unfavourably within the cell so that a direct communication with the base station is not possible, or will only support a low data rate. For example, the end user terminal may be located at an edge of the cell serviced by the base station or may be in a position with respect to the base station subject to a deep lognormal fade.

This problem has been addressed in a multi-hop wireless communications system in which the end user terminal and the servicing base station may communicate with each other, either directly and/or via at least one of a plurality of relay equipments. Therefore, if a direct communication between a source equipment (for example, a base station or an end user terminal) and a destination equipment (for example, the other of an end user terminal or base station, respectively) is poor, an indirect communication can be made via one or more relays. If good propagation conditions exist along the path of the indirect communication, higher data rates can then be supported. Also, because the source equipment and any relay equipment on the communication path will generally transmit at a lower power as compared to the power with which the source equipment would have to transmit in order to successfully communicate over a direct path, interference within the communication system can be reduced. The plurality of relay equipments may include dedicated relay equipments, which are either fixed or mobile and which are deployed either by the system operator or by the user of the end user terminal, to enhance coverage in a particular area of a system. The plurality of relay equipments may also include other end user terminals with the functionality to act as a relay equipment, and again may be fixed or mobile.

A relay equipment receives a radio signal from a source equipment and performs some further processing on it, before retransmitting it towards a destination equipment. This processing may for example include simple amplification, possibly combined with frequency or time translation. Alternatively, this processing may also include demodulation, error correction and re-modulation. Where the relay function terminates a link, a switching function will also be present in each relay equipment.

In such multi-hop wireless communications systems, the routing of indirect communications between the source equipment and destination equipment via at least one relay equipment is typically undertaken, using link state routing protocols. A single optimum path is generally chosen in accordance with the routing protocol between the source equipment and the destination equipment. To select an optimum path for a communication, the link state of all the links between the base station, end user terminal and the relay equipments have to be measured. Therefore, these protocols are inherently slow and cannot respond to rapidly changing propagation conditions. That is, propagation conditions may change too rapidly for the link state to be measured and for the link state measurements to be distributed around the system in a timely manner without excessive overhead. In addition whenever an optimum path changes, some link layer packets are left in buffers on the old optimum path, leading to fragmentation of higher layer packets, increased jitter and delay. Also, although the optimum path may be adjusted in response to traffic load, there is potential for added delay at the switching relay equipments.

SUMMARY OF THE INVENTION

The present invention relates generally to a multi-hop wireless communications system in particular a multi-hop wireless cellular communication system in which the decision about which relays carry which signals is distributed to the relay equipments. Each relay equipment has the functionality to decide from a plurality of signals it receives from one or more source equipments, which of these received signals to relay to destination equipments.

According to a first aspect of the present invention there is provided a multi-hop wireless communications system wherein signals may be relayed from a source equipment towards a destination equipment via a relay equipment, wherein such a relay equipment receives a plurality of signals from one or more source equipments and selects from the plurality of signals a signal to relay.

According to a second aspect of the present invention there is provide a method in a multi-hop wireless communications system of relaying a signal from a source equipment towards a destination equipment via a relay equipment, comprising the steps of:

such a relay equipment receiving a plurality of signals from one or more source equipments; and
    the relay equipment selecting from the plurality of signals a signal to relay.

The first and second aspects of the present invention enable a reduction in the signalling overhead, as compared to the use of link state protocols, because the decision as to which relay equipments carry which signals is not made centrally, for example at a base station or at an end user terminal of the system. Instead, this decision making process is distributed to the relay equipments, which each decide, which of the signals they receive from source equipments of the system to relay to a destination equipment. In addition the routing of signals via relay equipments in accordance with the present invention adapts quickly to changes in propagation conditions in the system environment.

According to a third aspect of the present invention there is provided a relay equipment for deployment in a multi-hop wireless communications system for relaying signals from a source equipment towards a destination equipment, wherein the relay equipment receives a plurality of signals transmitted from one or more source equipments and from these selects a signal to relay towards a destination equipment of the selected signal.

According to a fourth aspect of the present invention there is provided computer readable media for installation on a relay equipment of a multi-hop wireless communications system for relaying a signal from a source equipment towards a destination equipment, the computer readable media carrying out the steps of:

processing a plurality of signals received by the relay equipment from one or more source equipments; and
selecting from these a signal for the relay equipment to relay towards a destination equipment of the selected signal.

The fourth aspect of the present invention relates to computer readable media, which can be installed on a relay equipment to configure a relay equipment to have the features and advantages of the third aspect of the present invention.

It is advantageous, that the relay equipments select from the plurality of signals they receive from source equipments those which are of the highest quality in terms of Signal to Interference and Noise Ratio (SINR), Carrier to Interference and Noise Ratio (CINR) or received signal strength to relay to destination equipments. In this way the amplification of noise by the relay equipments is minimised. Accordingly, the or each relay equipment measures the quality of the signals it receives and selects, based on the quality of the received signals, a signal to relay. The component of the relay equipment for carrying out such measurements and for making such selections is referred to herein as a signal processor. However, it will be apparent to those skilled in the art that numerous implementations are possible, including a microcomputer or a digital signal processor, without deviating from the spirit of the invention. Thus, the relay equipments may comprise a signal processor for measuring the quality of each signal the relay equipment receives, for comparing the quality measured for each signal to a threshold quality for that signal and for rejecting those received signals of a quality below the threshold. In addition or alternatively, the signal processor may measure the quality of each signal the relay equipment receives and select the signal having the best measured quality. This may be achieved by the signal processor measuring the quality of each signal it receives, comparing the quality measured for each signal to a threshold quality for that signal, forming a candidate set of signals comprising those received signals having a quality above the threshold and selecting a signal from the candidate set of signals.

For an uplink signal transmitted from an end user terminal to a base station, via a relay equipment, the signal processor of the relay equipment may measure the quality of each signal it receives on an uplink from an end user terminal, compare the quality measured for each uplink signal to a threshold quality for that uplink signal, form a candidate set of uplink signals comprising those received uplink signals having a quality above the threshold, measure the quality of each signal it receives on a downlink from a base station, compare the quality measured for each downlink signal to a downlink threshold quality for that downlink signal, form a candidate set of downlink signals comprising those received downlink signals having a quality above their thresholds, select that uplink signal of the candidate set of uplink signals having the biggest difference between its measured quality and its threshold quality whose corresponding downlink signal is a member of the candidate set of downlink signals and then the relay equipment will relay that selected uplink signal towards the destination equipment. In this way the relay equipment chooses the best quality of signal to relay, again minimising noise amplification by the relay equipments of the system.

For a downlink signal transmitted on a communication path from a base station to an end user terminal, there is a problem of many relay equipments, some of which are located at a high distance from the destination end user terminal, receiving the signal from the base station at a high signal strength. Thus, further steps are required in the decision about which downlink signal a relay equipment chooses to support, and these further steps may be based on whether the relay equipment receives a good quality uplink signal from the destination end user terminal.

Accordingly, the signal processor of the relay equipment may measure the quality of each signal it receives on a downlink from a base station, compare the quality measured for each downlink signal to a downlink threshold quality for that downlink signal, form a candidate set of downlink signals comprising those received downlink signals having a quality above their thresholds, form a candidate set of uplink signals comprising the signals received by the relay equipment on uplinks which received uplink signals were received with a quality above their uplink threshold quality, select that downlink signal of the candidate set of downlink signals whose corresponding uplink signal which is a member of the candidate set of uplink signals has the biggest difference between its measured quality and its threshold quality to relay. The associated uplink and downlink signals or communications may form a duplex communication between a particular end user terminal and a servicing base station of the system.

In order to minimise the amplification of noise by the relay equipments and favour the amplification of high quality signals by the relay equipments of the system, each relay equipment may amplify the selected signal it relays by an amount dependent on the measured quality of the selected signal. The measure of quality of a signal received by the relay equipment may be the SINR, CINR or the received signal strength of the received signal.

In order to reduce the overall power of signals transmitted by system components, including source equipments and relay equipments, to the lowest level sufficient to support communications over the system at their required data rate, a power control arrangement may be employed according to which the power of the signal transmitted by a source equipment is dependent on feedback received from its associated destination equipment.

The relay equipments may be dedicated relay equipments or may be end user terminals, either of which may be fixed or mobile. For an end user terminal, such as a fixed or mobile telephone or computing device, to act as a relay, that end user terminal requires relay functionality.

The system according to any aspects of the present invention as set out above may be a multi-hop cellular wireless communications system. Also, in the aspects of the present invention described above the source equipment may be one of a base station or an end user terminal and the destination equipment may be the other of the base station or end user terminal. Alternatively, the source and destination equipments may both be end user terminals.

Other aspects and features of the present invention will become apparent to those ordinarily skilled in the art upon review of the following description of specific embodiments of the invention in conjunction with the accompanying Figures.

BRIEF DESCRIPTION OF THE DRAWINGS

In order that the present invention is more fully understood and to show how the same may be carried into effect, reference shall now be made, by way of example only, to the Figures as shown in the accompanying drawing sheets, wherein.

DETAILED DESCRIPTION OF PREFERRED EMBODIMENTS

There will now be described by way of example the best mode contemplated by the inventor for carrying out the invention. In the following description, numerous specific details are set out in order to provide a complete understanding of the present invention. It will be apparent, however, to those skilled in the art that the present invention may be put into practice with variations of the specific.

One aspect of the present invention are the mechanisms by which relay equipments are chosen from the many that may be available for a communication and the way in which the communication paths between source and destination equipments, via relay equipments are set up and maintained.

Figure 1:
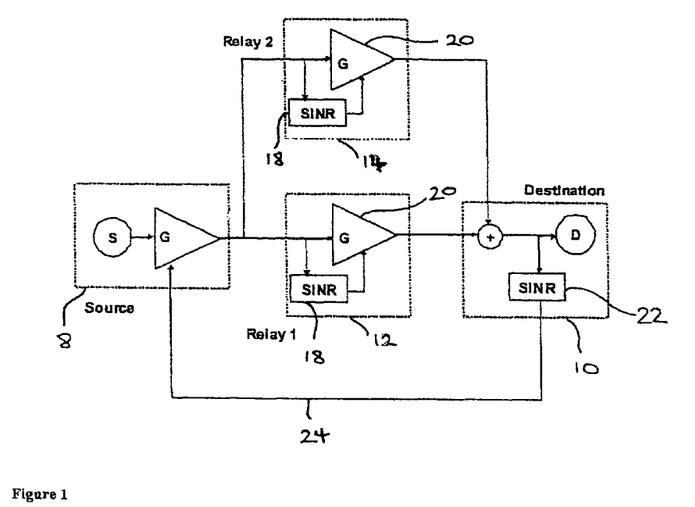
FIG. 1 shows schematically the apparatus of a multi-hop cellular wireless communications system involved in a communication between a source equipment and a destination equipment via two relay equipments in accordance with the present invention.

FIGS. 2 to 4 and 6 to 8 are used to describe embodiments of the present invention relating to an uplink, in which the source equipment is a mobile end user terminal (2) and the destination equipment is the base station (4) of the cell (6) in which the mobile terminal is located. The mobile terminal (2) may for example be a mobile telephone or a mobile computing device. The present invention is equally applicable to end user terminals which are fixed, such as telephones or computing devices connected to a fixed wireless access apparatus. Similar considerations apply to the downlink, the details of which are described in relation to FIGS. 5, 7 and 9 in which the source equipment is a base station (4) and the destination equipment is a mobile end user terminal (2) which is located in a cell (6) serviced by the base station (4). The present invention may also be applied to communication paths between end user terminals. FIG. 1 shows a generalised communication in accordance with the present invention between a source equipment (8) and a destination equipment (10) which is applicable to the uplink, the downlink or to a communication between two end user terminals. When a downlink is considered the source equipment of FIG. 1 is a base station (4) and the destination equipment is a mobile terminal (2). When an uplink is considered the source equipment of FIG. 1 is a mobile terminal and the destination equipment is a base station (4). When a communication between two end user terminals is considered the source equipment of FIG. 1 is an end user terminal and the destination equipment is an end user terminal. The relay equipments (12-17) shown in FIGS. 1 to 5 may be other end user terminals which incorporate functionality to operate as a relay or may be dedicated relays placed in the cell by the system operator or by an end user. These relay equipments (12-17) may be fixed or mobile.

Figure 7:
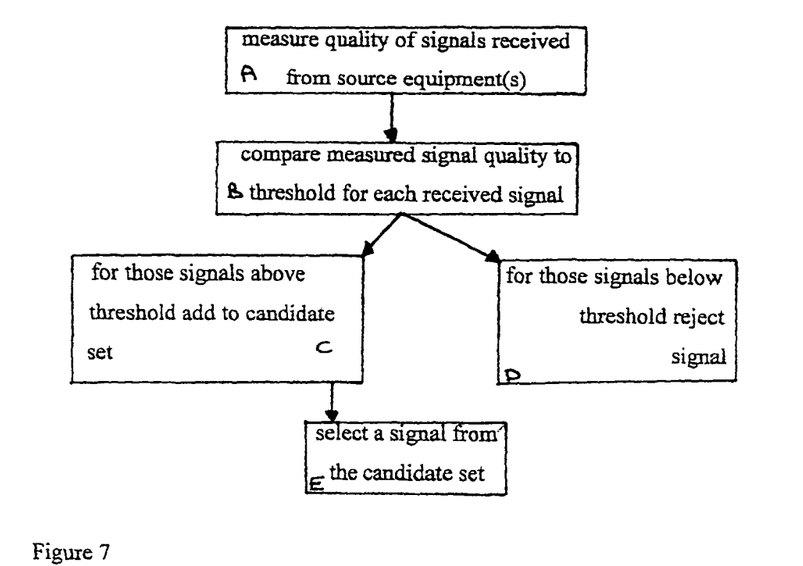
FIG. 7 shows the steps of a method carried out by a relay equipment or by media installed on a relay equipment for the relay equipment to select which received signal to relay in accordance the present invention.
Figure 8:
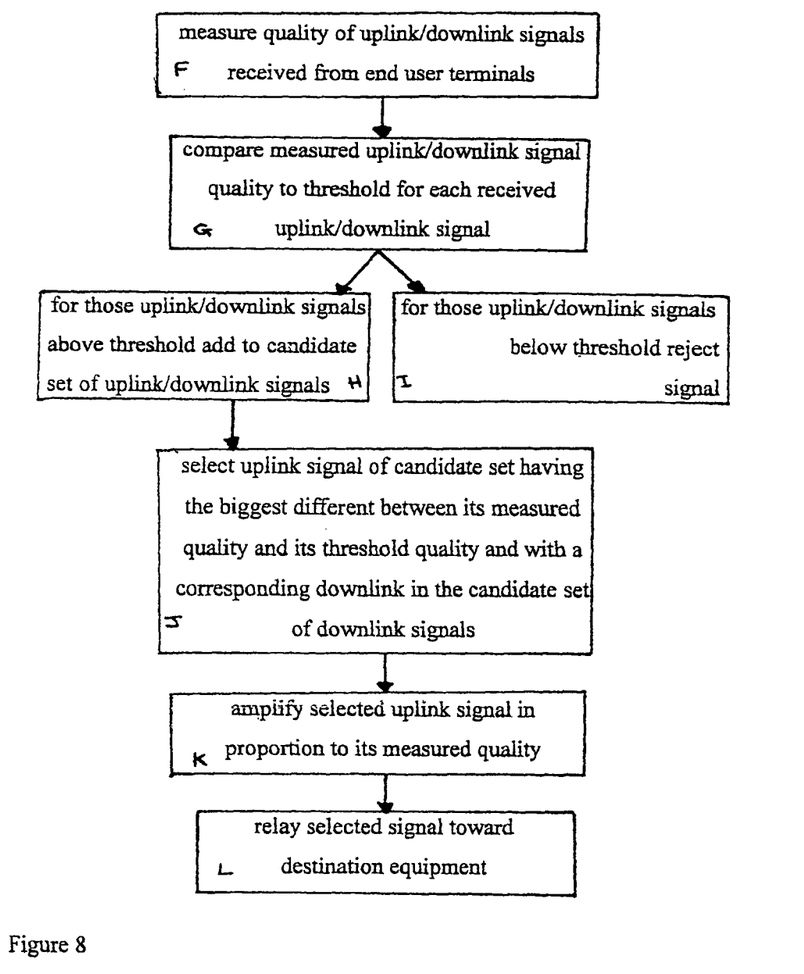
FIG. 8 shows the steps of a method carried out by a relay equipment or by media installed on a relay equipment for the relay equipment to select which received uplink signal to relay in accordance the present invention.

Referring now to FIGS. 1 to 4 and 6 to 8, each relay equipment (12-16) that receives one or more uplink signals from one or more source mobile terminals (2, 8) determines the Signal to Interference and Noise Ratio (SINR) of the received signal from each of the source mobile terminals (2, 8) [Box A of FIG. 7 and Box F of FIG. 8]. As shown in FIG. 1, the relay equipments (12-14) include a signal processor (18) for measuring and storing the SINR for uplink signals received from the or each of the source mobile terminals (8). An approximation to the SINR may be used, such as the Carrier to Interference and Noise Ratio (CINR) or the received signal strength. Then, a candidate set of uplink signals is formed by each relay equipment (12-16) by its signal processor (18). Each signal in the candidate set for a relay equipment is one of the uplink signals received by that relay equipment which has a SINR greater than a predetermined threshold [Boxes B, C and D of FIG. 7 and Boxes G, H and I of FIG. 8]. In particular, in the example shown in FIG. 6 the relay equipment (12) receives three uplink signals from three source mobile terminals ($2_1$, $2_2$, $2_3$) which have a SINR above the predetermined threshold, relay equipment (14) receives four uplink signals from four source mobile terminals ($2_1$, $2_4$, $2_5$, $2_6$) which have a SINR above the predetermined threshold and relay equipment (16) receives two uplink signals from two source mobile terminals ($2_3$, $2_7$) which have a SINR above the predetermined threshold. The SINR threshold level for each received uplink signal is set according to the data rate to be supported by that uplink signal. Therefore, in the FIG. 6 example, the SINR threshold levels set for each of the uplink signals received by the relay equipment (12) from the mobile terminals ($2_1$, $2_2$, $2_3$) will be different from one another, if the communications from the mobile terminals ($2_1$, $2_2$, $2_3$) require different data rates.

Each relay equipment (12-16) that receives one or more downlink signals from one or more source base stations (4) also determines the Signal to Interference and Noise Ratio (SINR) of the received signal from each of the source base stations (4) [Box A of FIG. 7 and Box F of FIG. 8]. As shown in FIG. 1, the relay equipments (12-14) include a signal processor (18) for measuring and storing the SINR for downlink signals received from the or each of the source base stations (4). An approximation to the SINR may be used, such as the Carrier to Interference and Noise Ratio (CINR) or the received signal strength. Then, a candidate set of downlink signals is formed by each relay equipment (12-16) by its signal processor (18). Each signal in the candidate set for a relay equipment is one of the downlink signals received by that relay equipment which has a SINR greater than a predetermined threshold [Boxes B, C and D of FIG. 7 and Boxes G, H and I of FIG. 8]. The SINR threshold level for each received downlink signal is set according to the data rate to be supported by that downlink signal. Therefore, in the FIG. 6 example, the SINR threshold levels set for each of the downlink signals received by the relay equipment (12) from the source base stations (4) will be different from one another, if the communications from the base stations (4) require different data rates.

The signal processor (18) of each relay equipment (12-16) will then select that uplink signal within its candidate set of uplink signals which was received with the greatest difference between its received SINR and its threshold SINR whose corresponding downlink signal is a member of the candidate set of downlink signals [Box E in FIG. 7 and Box J in FIG. 8]. Then the relay equipment (12-16) will act as a relay for that selected uplink signal [Boxes K and L in FIG. 8]. So in the example in FIG. 6, at relay equipment (12) the received signal from mobile terminal ($2_2$) is the one with the greatest difference between the SINR with which it was received by the relay equipment (12) and the threshold SINR for the signal from the mobile terminal ($2_2$). The threshold SINR for the signal from the mobile terminal ($2_2$) is related to the data rate required for the communication from the mobile terminal ($2_2$) to the base station (4). Therefore, assuming that the corresponding downlink signal is a member of the candidate set of downlink signals, relay equipment (12) acts as a relay for the mobile terminal ($2_2$). The mobile terminal ($2_1$) and the mobile terminal ($2_3$) must rely on other relay equipments (for example, relay equipment (14) for mobile terminal ($2_1$) and relay equipment (16) for mobile terminal ($2_3$)) to act as a relay for them on their uplink to the base station (4).

Therefore, the choice of relay equipments (12-16) for uplinks from particular mobile terminals (2, 8) is not determined centrally, for example by the mobile terminal (2, 8) or by the base station (4). Instead this decision making process is distributed among the relay equipments (12-16). This is because each relay determines for itself whether or not it should act as a relay for an uplink from a given mobile terminal. This reduces the signalling overhead as compared to that required to support a system in which the choice of relay equipments is made centrally. It also makes the system highly responsive to changes in propagation conditions in the system environment.

As set out above, the quality threshold applied to a signal received by the relay equipments may be set in accordance with the data rate of the signal. For example, compressed speech usually has a data rate of approximately 10 kbps, whereas transfer of data, such as pictures, is best achieved at higher data rates, such as 384 kbps. Although high data rates are not available on, for example, 2G ($2^{nd}$ Generation) cellular systems, such as GSM, they are becoming available on 2.5G cellular systems, such as GPRS and EDGE, and on 3G ($3^{rd}$ Generation) cellular systems, such as IMT-2000.

Discrimination between signals of different data rates can be achieved, for example, by monitoring the control channel between the base station and the mobile terminal, which control channel is used by the source to inform the destination of the data rate that is to be used, perhaps based on measurements of the received signal quality provided by the destination, or alternatively by monitoring the coding used on the signal: for example, higher data rate signals in CDMA based systems such as IMT-2000 make use of smaller spreading codes than lower data rate signals.

The optimum set of data rate dependent SINR threshold levels at each relay equipment (12-16) is likely to vary quite slowly and so these threshold levels may be conveniently set by the system, for example, via the base station (4) servicing the cell within which the relay equipments (12-16) are located. Periodically, the relay equipments (12-16) will be sent updated SINR thresholds by the base station (4) and these thresholds will be stored for use by the signal processor (18) of the relay equipments. The SINR threshold level may be set higher for high bit rate traffic, if this requires a higher SINR, which may result, for example, from the use of higher level modulation or, in a Code Division Multiple Access (CDMA) system, from the use of a smaller spreading factor. The SINR threshold level may also, for example, be set so that relay equipments known to be near a cell boundary, which may be expected to contribute proportionately more interference to neighbouring co-channel cells, will have a higher SINR threshold, making them less likely to transmit.

Once the relay equipment (12-16) has selected the uplink signal received from a mobile terminal (2, 8) from the candidate set of uplink signals for which it will act as a relay, that relay equipment forwards the selected uplink signal towards the base station (4) either directly or via another relay equipment (2). The power with which the relay (12-16) retransmits the selected uplink signal is proportional to the SINR, CINR or received signal strength with which the selected uplink signal was received. This is illustrated in FIG. 1 in which the uplink signal from the source mobile terminal (8) is the selected uplink signal for the relay equipments (12) and (14). Each relay equipment (12,14) stores the SINR with which the selected uplink signal was received at the signal processor (18) and the signal processor (18) applies a gain value proportionate to this SINR level to an amplifier (20) which amplifies the selected uplink signal [Box K in FIG. 8] before it is transmitted by the relay equipment (12,14) towards the destination base station (10)

The gain of a relay equipment is defined as the ratio of the power transmitted by the relay to the power received by the relay. In the preferred embodiment, the gain is related to the SINR of the signal received by the relay as follows: if the SINR of the signal received by the relay is less than the threshold, then the gain is zero and hence the power transmitted by the relay is zero; if the SINR of the signal received by the relay is greater than the threshold, then the gain is a constant multiplied by the SINR of the signal received by the relay. The value of this constant will typically be determined according to the expected path loss in the prevailing environment and set by the system via the base station. Hence, the power transmitted by a relay will be in direct proportion to the SINR of the signal received by the relay.

It will be appreciated by those skilled in the art that the relationship between the SINR of the signal received by the relay and the gain, as well as the value of the gain, may be varied to suit different environmental conditions, such as different propagation and interference conditions, without deviating from the spirit of the invention. For example:

- In an environment dominated by lognormal fading, in which it is desired to obtain maximum diversity against such fading, a gain which is constant and independent of the received SINR, provided it is above the threshold, may be preferred, as this will result in the signal received by the destination being influenced by the maximum number of relays;
- A gain which is proportional to the received SINR at the relay, provided it is above the threshold, as described above, results in the signal received by the destination being predominantly influenced by the relays close to the source. This is preferred when the source to relay propagation is particularly difficult, for example due to the relatively low height of the source antenna and/or relay antenna if, for example, they are mobile terminals.
- A gain which is inversely proportional to the received SINR at the relay, provided it is above the threshold, will result in the signal received at the destination being predominantly influenced by relays close to the destination. This may be preferred if relay power is to be conserved, for example if mobile terminals powered by batteries are to be used as relays.
- More complex algorithms for determining the relay gain, based on the SINR of the signal received at the relay, may also be envisaged: for example, radial basis functions may be used so that the received signal at the destination is dominated by relays whose received signal SINR is close to some reference value. This will have the effect of reducing the gain of relays very close to the source, which may be influenced by the same lognormal fade that is affecting the direct signal between the source and destination, while still retaining the clustering effect of a gain which is proportional to the received signal SINR at the relay. The value of the reference SINR may then be set dependent on the correlation distance of the lognormal fading environment.

Accordingly, uplink signals that are very weakly received by the relay equipments (12-16) are not retransmitted, because they have a SINR below the threshold. Strongly received signals are selected by the relay equipments (12-16) for re-transmission, assuming that the corresponding downlink signals are members of the candidate sets of downlink signals, and are appropriately amplified by the amplifiers (20) of the relay equipments (12-16) so that they are re-transmitted at appropriate powers, because they can be expected to contribute significantly to the final received signal strength at the base station (4). Signals that are received with intermediate strength, and whose corresponding downlink signals are members of the candidate sets of downlink signals, may or may not be selected by the relay equipments (12-14) depending on the competing uplink signals in the candidate set, and if selected are retransmitted, but possibly less strongly so as to avoid excessive amplification of any received noise. This can be considered to be a first uplink power control loop.

The SINR with which the signal transmitted by a source mobile terminal (2, 8) is received by a relay equipment (12-16) is in part determined by the power with which it is transmitted by the mobile terminal, in addition to the prevailing propagation conditions between the mobile terminal and the relay equipment. The measured SINR is of the signal received at the destination equipment and this may, for example, be formed by combining the signals from two or more relays or alternatively by selecting the stronger of the signals. To minimise interference, a second uplink power control loop operates between each mobile terminal (12-16) and the base station (4). The power with which an uplink signal is transmitted by a source mobile terminal (2, 8) is controlled by the base station (4) servicing that mobile terminal. The power with which the uplink signal is transmitted by the source mobile (2, 8) is decreased until the SINR of the uplink signal as received at the base station (4) is just enough to support the required data rate. Again an approximation of the SINR could be used such as the CINR or the received signal strength of the uplink signal received at the base station (4). This is illustrated in FIG. 1, in which the destination base station (10) includes a signal processor (22) for measuring the SINR of the uplink signal from the source mobile terminal (8) received via the two relays (12, 14). In response to the measured SINR of the uplink signal from the mobile terminal (8), the signal processor (22) determines an amount by which the power of the uplink signal transmitted by the mobile terminal (8) should be reduced. A message indicating this amount is sent to the mobile terminal, as indicated schematically in FIG. 1 by feedback loop (24). This feedback may be incremental, in that several feedback messages may be sent along the loop (24) requesting a reduction in the power of the uplink signal transmitted by the mobile terminal before the SINR of the uplink signal as received by the base station is just above that needed to support the required data rate. Should the power of the signal received at the destination equipment fall below the required level, instructions from the destination equipment will be sent by feedback loop (24) to the source equipment to increase the power transmitted by the source equipment.

Accordingly, as illustrated in FIG. 1, a first power control system is implemented at the relay equipments (12, 14) by the signal processor (18) and amplifier (20) and a second power control system is implemented at the base station (4) by the signal processor (22) and feedback loop (24). These power control systems work together so as to be capable of rapid adaptation to changing environmental conditions. This power control arrangement reduces interference between co-channel cells of the system because the source mobile terminal (2, 8) and the relay equipments (12-16) transmit the uplink signal at lower powers than would be required if the source mobile terminal (2, 8) had to transmit the uplink signal directly to the base station (4). An additional factor reducing such co-channel interference is that the relay equipments (12-16) are generally closer to the base station (4), i.e. further from the edges of the cell (6) than the source mobile terminals (2, 8) and so will contribute less to interference in other co-channel cells.

A relay equipment (12-17) cannot receive and transmit on the same orthogonal channel. A time delay and/or a change in frequency are usually required between the signal received by the relay equipment and the re-transmitted signal. Consequently, the channel (e.g. frequency $f_1$) used for communication of the uplink signal between the source mobile terminal (2, 8) and the relay equipment (12-16) will be different to the channel (e.g. frequency $f_2$) used between the relay equipment and the destination base station (4). The power control systems as described above have a natural tendency to reduce the transmitted power and so there is a tendency for mobile terminals to make use of relay equipments in their vicinity, so forming clusters, rather than using relay equipments more widely distributed within a given cell. Consequently, with reference to FIG. 6, the possibility exists to re-use a frequency $f_1$, which is assigned to communication between the mobile terminal ($2_6$) and the relay (14) in a first re-use cluster ($2_1$, $2_4$, $2_5$, $2_6$, 14) within the cell (6) for a communication between the mobile terminal ($2_7$) and the relay (16) in a second re-use cluster ($2_3$, $2_7$, 16) within the cell. This is provided the re-use clusters that result are sufficiently far apart to be isolated, as is the case in FIG. 6. This frequency re-use can be used to further enhance the spectral efficiency of a communication system operating in accordance with the present invention.

Figure 2:
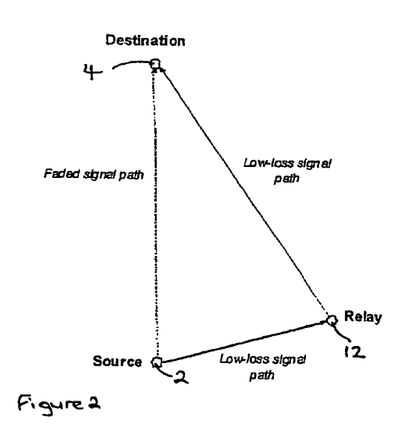
FIG. 2 shows schematically the geographical location of source, relay and destination equipments over which an indirect uplink communication is made in accordance with the present invention.

FIG. 2 shows a source mobile terminal (2) in a lognormal fade as regards its communication path with a base station (4). A relay equipment (12) which is in a good position both for communication with the base station and with the mobile terminal acts as a relay for the mobile terminal. The relay equipment (12) is no closer to the base station (4) than the mobile terminal (2). However, a reduction of transmit power is achieved, due to the fact that the relay equipment (12) is not in a fade as regards its communication with the base station (4). This reduction in transmit power will reduce interference from relays in co-channel cells. Also, because the base station (4) receives a strong signal from the relay equipment (12), it commands the mobile terminal (2) (via the feedback loop (24) of FIG. 1) to reduce its transmit power, thus reducing interference power produced by the source mobile terminal.

Figure 3:
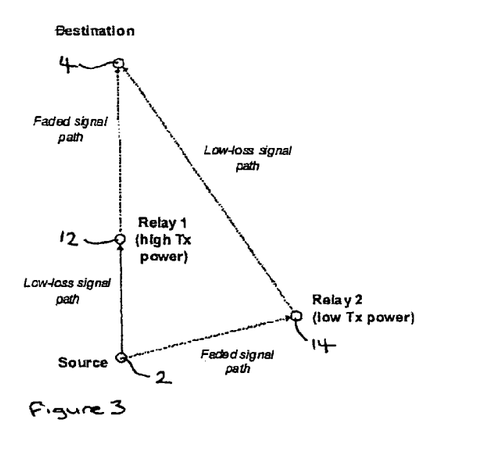
FIG. 3 shows schematically the geographical location of source, first and second relay and destination equipments over which an indirect uplink communication is made in accordance with the present invention.

FIG. 3 shows a source mobile terminal (2) which communicates with a base station (4) via two communication paths, with a single relay equipment (12, 14) in each path. This is analogous to the arrangement shown in FIG. 1. In the arrangement in FIG. 3, again a deep fade exists on the direct path between the source mobile terminal (2) and the destination base station (4). There also exists a faded path between the first relay equipment (12) and the base station (4) and between mobile terminal (2) and the second equipment relay (14). The paths between the mobile terminal (2) and the first relay equipment (12) and between the second relay equipment (14) and the base station (4) are low loss paths. In this scenario, the first relay equipment (12) receives a strong uplink signal from the mobile terminal and (assuming it is the best out of the candidate set of uplink signals for that relay and that the corresponding downlink signal is a member of the candidate set of downlink signals for that relay) as a consequence re-transmits it at high power, but over a faded path to the base station (4). The second relay receives a weak uplink signal from the mobile terminal (2) and (assuming it is above the threshold and it is the best out of the candidate set of uplink signals for that relay and that the corresponding downlink signal is a member of the candidate set of downlink signals for that relay) as a consequence re-transmits it at low power, but over a low loss path, to the base station (4). Hence, there is significant signal attenuation on the communication path via the first relay (12) and on the communication path via the second relay (14). This represents one of the worst scenarios; however, there is still an advantage if either the first or second relay is closer to the base station (4) than the source mobile terminal (2), as well as from the diversity gain associated with the use of two communication paths.

Figure 4:
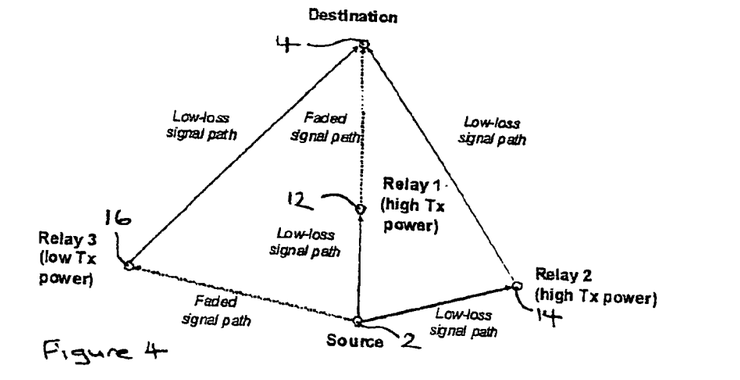
FIG. 4 shows schematically the geographical location of source, first, second and third relay and destination equipments over which an indirect uplink communication is made in accordance with the present invention.

In the scenario shown in FIG. 4, again there is a deep fade on the direct path between the source mobile terminal (2) and the destination base station (4). FIG. 4 shows the mobile terminal (2) communicating with the base station (4) via three communication paths each of which is via one relay equipment (12-16). There exists a faded path between the mobile terminal (2) and the third relay equipment (16) and a faded path between the first relay equipment (12) and the base station (4). The paths between the mobile terminal (2) and the first relay equipment (12), between the mobile terminal (2) and the second relay equipment (14), between the second relay equipment (14) and the base station and between the third relay equipment (16) and the base station (4) are all low loss paths. The first and second relay equipments (12, 14) each receive a strong uplink signal from the mobile terminal (2) and (assuming it is the best out of the candidate set of uplink signals for those relay equipments and that the corresponding downlink signal is a member of the candidate sets of downlink signals for those relay equipments) as a consequence both re-transmit the uplink signal at high power. Because of the low-loss path between the second relay (14) and the base station (4), the uplink signal from the mobile terminal (2) as received at the base station (4) is particularly strong, especially combined with the received signal from the first relay (12), taking advantage of diversity gain. As a result the mobile terminal (2) is commanded by the base station (4) to reduce its transmit power. This causes the strength of the uplink signal from the mobile terminal (2) as received by the third relay (16), which is already weak due to the faded path between the mobile terminal (2) and the third relay (16), to reduce further. The reduction in uplink signal strength received by the third relay (16) may be sufficient to force it below the SINR threshold, even though the corresponding downlink signal is a member of the candidate set of downlink signals, or to cause the third relay to choose a different signal from its candidate set of uplink signals, in which case the third relay (16) stops re-transmitting the uplink signal from the mobile terminal (2). In addition, the retransmitted uplink signal from the relay equipments (12) and (14) are reduced in proportion to the lower power uplink signal transmitted by the source mobile terminal (2) and received by the relay equipments (12, 14). In this way the overall transmit power is reduced, resulting in lower interference to neighbouring co-channel cells of the system.

Figure 5:
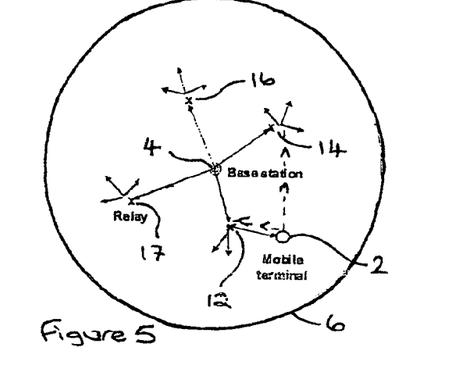
FIG. 5 shows a cell of a multi-hop cellular wireless communication system in which a servicing base station communicates with an end user terminal via a relay equipment in an indirect downlink communication in accordance with the present invention.
Figure 6:
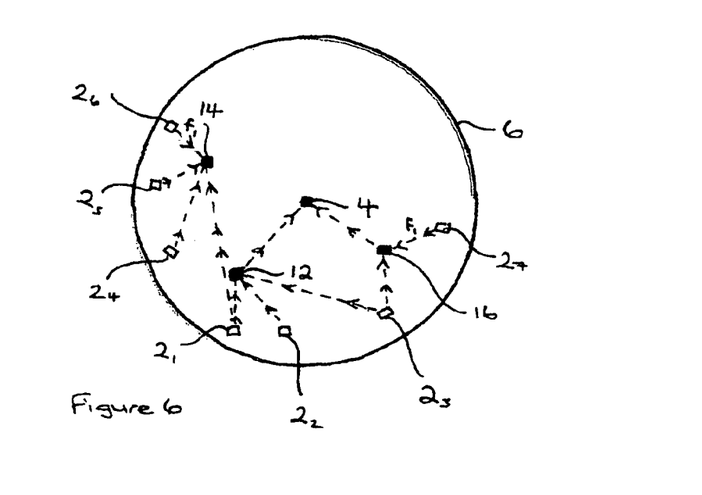
FIG. 6 shows a cell of a multi-hop cellular wireless communication system in which a plurality of end user terminals attempt communications with a base station via a relay in an indirect uplink communication in accordance with the present invention.

There is a potential problem on the downlink from the base station (4, 8) to the mobile terminals (2, 10) caused by the large number of relay equipments (for example relay equipments (12-17) in FIG. 5) that may strongly receive the downlink signal to the mobile terminal (2) from the base station (4). A large proportion of these signals will be above the relevant SINR threshold and corresponding relays will retransmit the downlink signal they receive. Consequently, the transmitted power will be high. Most of the re-transmitted downlink signals from the relay equipments (14, 16, 17) will be in distant parts of the cell (6) from the destination mobile terminal (2) and so will not reach the destination mobile terminal (2), but will contribute to the general level of interference experienced by neighbouring co-channel cells.

To avoid this problem, feedback from the destination mobile terminal (2, 10) can be used in determining whether or not an individual relay equipment should include itself in the downlink path. To this end a modified set of rules set out below, as compared to the uplink, is required for the downlink, in order for the best relay equipments to be selected to carry the downlink signal to the destination mobile terminal.

Figure 9:
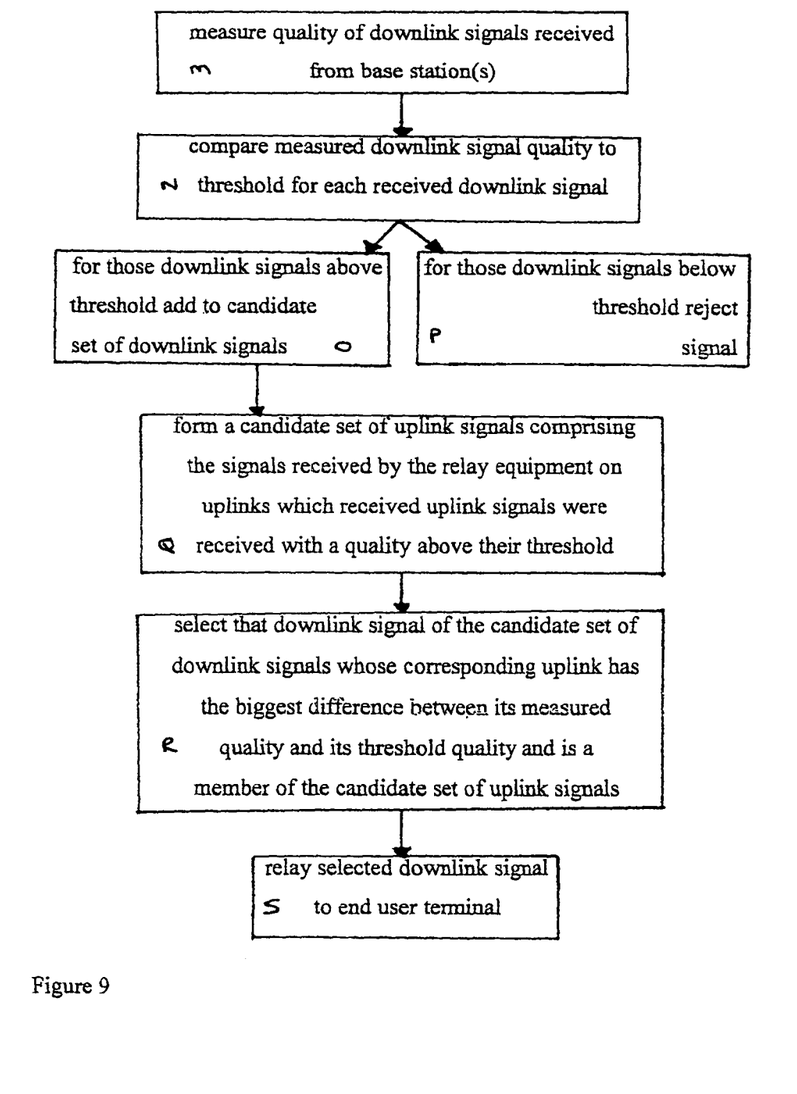
FIG. 9 shows the steps of a method carried out by a relay equipment or by media installed on a relay equipment for the relay equipment to select which received downlink signal to relay in accordance the present invention.

With reference to FIG. 5, each relay (12-17) which receives one or more downlink signals from a source base station (4), has a signal processor (18) which determines the SINR of each of the received signals [Box M in FIG. 9]. An approximation to the SINR of the downlink signal may alternatively be used, such as the CINR or the received signal strength. A relay equipment (12-17) may receive signals from more than one base station, for example if it is near to the edge of the cell (6). Also, a relay equipment (12-17) may receive more than one downlink signal from a base station (4) if, for example, the base station is transmitting signals intended for more than one mobile terminal (2). A candidate set of downlink signals is formed by each relay equipment (12-17) by the signal processor (18). Each signal in the candidate set for a relay equipment is one of the downlink signals received by that relay equipment which has a SINR greater than a predetermined threshold [Boxes N, O and P in FIG. 9]. In particular, in the example shown in FIG. 5 assume each of the relay equipments (12-17) receive three downlink signals from the base station (4), one of which is destined for mobile terminal (2), which three signals all have a SINR above the predetermined threshold. In the same way as for the uplink the SINR threshold level for each received downlink signal is set according to the data rate to be supported by that downlink signal. Thus, if the base station is transmitting signals intended for more than one mobile terminal, or if downlink signals are received from more than one base station, the candidate set of downlink signals will correspond to different paths, each to different destination mobile terminals or from different source base stations. The signal processor (18) then generates a candidate set of uplink signals which include those uplink signals received by the relay equipment which were received with a measured quality above the associated threshold [Box Q in FIG. 9]. Then the signal processor (18) selects that downlink signal of the candidate set of downlink signals whose corresponding uplink signal which is a member of the candidate set of uplink signals has the biggest difference between its measured quality and its threshold quality [Box R in FIG. 9]. The selected downlink signal is then relayed by the relay equipment to the destination end user terminal [Box S in FIG. 9]. Thus, the relay equipments (12-17) that receive a downlink signal from the base station to the destination mobile terminal (2), but do not receive a corresponding uplink signal from that mobile terminal (2) are prevented from re-transmitting that downlink signal.

Each relay periodically updates the candidate sets of uplink and downlink signals, based upon measurements of the SINR of the signals received by the relay. The frequency with which measurements should be updated will depend on such factors as the propagation environment and the mobility of the source and the relay.

So in the example of FIG. 5, the base station transmits a downlink signal to mobile terminal (2), which is received by the relay equipments (12-17). Relay equipment (16) and relay equipment (17) receive the downlink signal to the mobile terminal (2) with a SINR below the relevant threshold and so the downlink signal to the mobile terminal (2) is not included in their sets of candidate downlink signals. Relay equipment (12) and relay equipment (14) receive the downlink signal to the mobile terminal (2) well enough that it forms part of their set of candidate downlink signals.

Considering in FIG. 5, first the relay equipment (12). The signal processor (18) of the relay equipment (12) then generates a candidate set of uplink signals. As relay equipment (12) receives the uplink signal from the mobile terminal (2) it is included in the candidate set of uplink signals. The signal processor (18) then selects that downlink signal of the candidate set of downlink signals whose corresponding uplink signal has the biggest difference between its measured quality and its threshold quality, assume that this is the downlink to the mobile terminal (2), and acts as a relay for that selected downlink signal. Thus, the relay equipment (12) selects itself to act as a relay in the downlink between the base station (4) and the mobile terminal (2).

Considering in FIG. 5, now the relay equipment (14). The signal processor (18) of the relay equipment (14) also generates a candidate set of uplink signals. The relay equipment (14) also receives the uplink signal from the mobile terminal (2). However, assume that this signal is received with strength below the associated uplink threshold, so the uplink from mobile terminal (2) is not included in the candidate set of uplink signals formed in the signal processor (18) of the relay equipment (4). Then the signal processor (18) of the relay (14) selects that downlink signal of the candidate set of downlink signals whose corresponding uplink signal which is a member of the candidate set of uplink signals has the biggest difference between its measured quality and its threshold quality. As the uplink signal from the mobile terminal (2) is not included in the candidate set of uplink signals, the signal processor (18) then selects a different one of the candidate set of downlink signals, other than the downlink to the mobile terminal (2), and so does not act as a relay for the downlink signal to the mobile terminal (2).

Once the relay equipment (12) has selected the downlink signal received from the base station (4) from the candidate set of downlink signals for which it will act as a relay, the relay equipment forwards the selected downlink signal towards the mobile terminal (2) [Box S in FIG. 9].

In the embodiments described above, the source is one of a mobile terminal or a base station and the destination is the other of a mobile terminal or a base station. The source may transmit a signal directly to the destination, as in a conventional cellular system, or it may transmit a signal to one or more relays. Each relay will then determine for itself whether or not to transmit a corresponding signal to the destination. However, it will be apparent to those skilled in the art that if a first relay is considered as a source by a second relay, then the present invention as described herein can be applied to paths containing multiple relays in series, such that a first relay may pass a signal to a second relay and hence by extension to subsequent relays before ultimately reaching the destination. In this case the first relay is the original source of the signal. The second relay will measure the signals received from both the original source and from other relays that it may consider to be sources for possible inclusion in the respective uplink and downlink candidate sets. The feedback loop (24) is retained between the original source, which is one of a mobile terminal or a base station, and the original destination, which is the other of a mobile terminal or a base station.

In the same way as for the uplink, the choice of relay equipments (12-17) for downlinks to particular mobile terminals (2, 8) is not determined centrally, for example by the mobile terminal (2, 8) or by the base station (4). Instead this decision making process is distributed among the relay equipments (12-17). This is because each relay equipment determines for itself whether or not it should act as a relay for a downlink to a given mobile terminal. This reduces the signalling overhead as compared to that required to support a system in which the choice of relay equipments is made centrally.

The power with which the relay (12-17) retransmits the selected downlink signal is proportional to the SINR, CINR or received signal strength with which the selected downlink signal was received by it. This is illustrated in FIG. 1 in which a downlink signal from the source base station (8) is the selected downlink signal for the relay equipments (12) and (14). Each relay equipment (12,14) stores the SINR with which the selected downlink signal was received at the signal processor (18) and the signal processor (18) applies a gain value proportionate to this SINR level to an amplifier (20) which amplifies the selected downlink signal before it is transmitted by the relay equipments (12,14) to the destination mobile terminal (10).

Again with reference to FIG. 1, the power with which a downlink signal is transmitted by the source base station (8) is controlled by means of a feedback loop (24) from the destination mobile terminal (10), in the same way as for the uplink, such that the transmit power at the base station (8) is decreased incrementally until the SINR of the received downlink signal at the destination mobile terminal (10) is just enough to support the required data rate. An approximation to the SINR, such as the CINR or the received signal strength could alternatively be used for this purpose.

In the above, the invention has been described using a power controlled system as an example. In such a system, the modulation is typically fixed and the power transmitted by the source equipment is maintained at a level which is just sufficient to support the corresponding data rate. The data rate is chosen to match the service or is fixed and the SINR threshold is set in each relay equipment based on this data rate. The threshold will therefore be varied relatively infrequently. In the process of reducing the source power, those relay equipments receiving signals with poorer SINRs will cease to re-transmit them as the SINR falls below the threshold.

The present invention is equally applicable to systems in which Adaptive Modulation and Coding (AMC) is employed, as is described below.

In a system which employs AMC, the second power control system comprising the signal processor (22) in the destination equipment (10) and the feedback loop (24) is dispensed with, for both the uplink and the downlink. Instead, the power transmitted by each source equipment (8) is set to be the highest of which that equipment's transmitter is capable of. The modulation and data rate between a given source equipment and destination equipment are then varied to suit the propagation conditions existing at any given time. This is typically based on measurements of the received SINR (or CINR or received signal strength) at the destination equipment. Higher level modulation is chosen to maximise the data rate on the link from a specific source equipment, and scheduling is employed to adjust the proportion of time for which a given source equipment transmits to a given destination, such that it produces an average data rate consistent with the service requirements. The instantaneous data rate selected at the source equipment is then chosen according to feedback from the destination equipment. Once the data rate for an uplink or downlink has been selected, the relay equipments can set an appropriate SINR threshold level.

Thus, for both power controlled and AMC communication systems, the relay equipments (12-17) behave similarly, in that they:
 a. select a SINR threshold level based on the data rate in order to form a candidate set of uplink or downlink signals, as described above;
 b. select an uplink or downlink signal to act as a relay for, from the relevant candidate set, as described above;
 c. determine the re-transmit power based on the SNIR of the signals they receive, as described above.

The difference is that the SINR threshold will remain relatively constant in the power controlled system described above, because the data rate of a communication is constant, whereas, in an AMC system, the SINR threshold will be varied to follow changes in data rate, produced by the source equipment in response to changing propagation conditions, and will hence change more frequently.

In summary, the only difference between the power controlled system described above in relation to FIGS. 1 to 6 and a system employing AMC is that source equipments transmit at the maximum power of which they are capable. Thus, the feedback loop (22, 24) of FIG. 1 is discarded and the source equipment (8) is set to transmit at the highest possible power. Where the source equipment (8) is a mobile terminal (2) it transmits the uplink signal at the highest power of which it is capable. Where the source equipment (10) is a base station (4) it transmits the downlink signals at the highest power of which it is capable.

Figure 10:
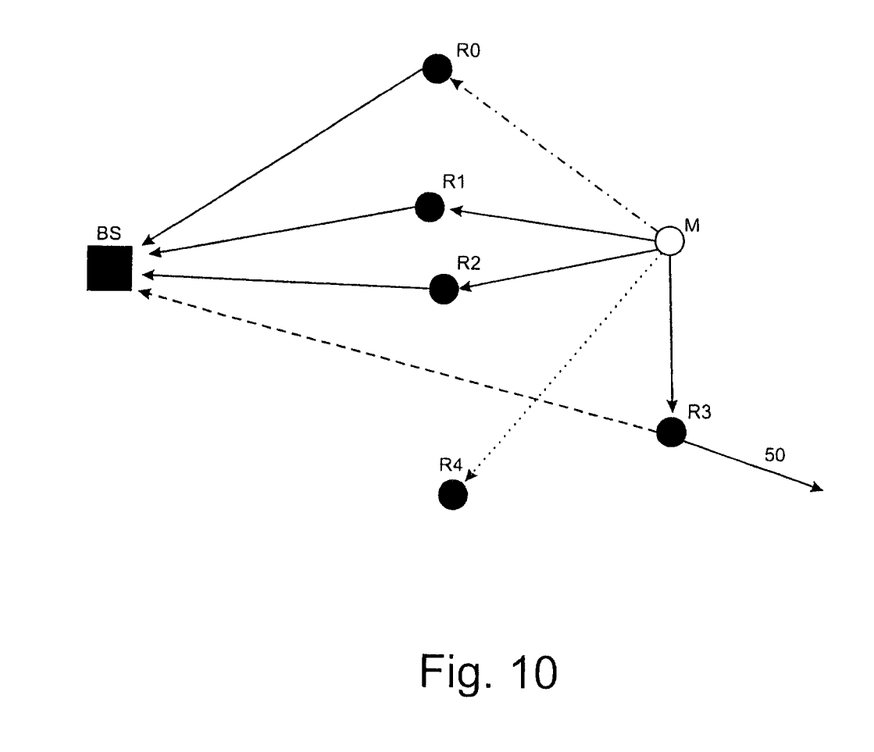
FIG. 10 shows an example scenario in which a base station uses an omni-directional antenna.
Figure 11:
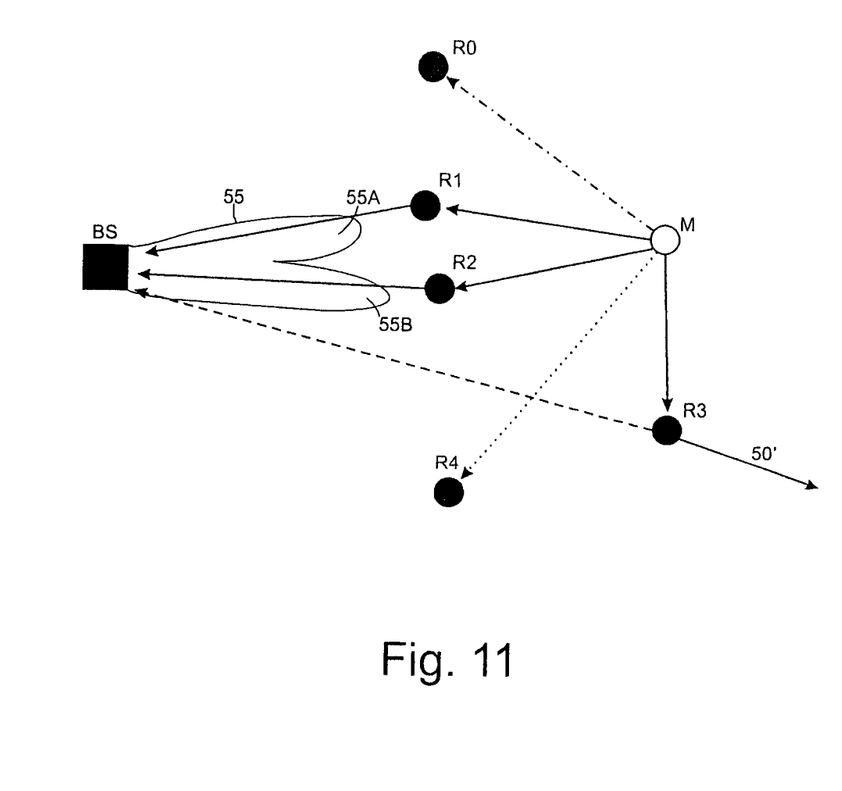
FIG. 11 shows the same example scenario as FIG. 10 but where the base station uses an adaptive antenna array.

A further improvement in performance is achievable by using a beam-forming antenna array at the base station. FIGS. 10 and 11 show the effect of this improvement. Firstly, FIG. 10 shows an example scenario in which the base station BS uses an omni-directional antenna. Five relays R0-R4 and a mobile terminal M are shown. The relay selection process occurs as follows. Each relay R0-R4 forms a candidate set of mobile terminals whose uplink signals are received at the relay with a quality (e.g. strength) greater than a predetermined threshold. Each relay retransmits the uplink signal of the mobile terminal in its candidate set whose signal quality as received at the relay is the highest (e.g. strongest relative to a predetermined threshold). In FIG. 10, relays R1, R2 and R3 receive a signal from mobile terminal M at a high signal level, relay R0 receives the signal at a strength which is just above the threshold level for retransmission, and relay R4 receives the signal at a strength which is just below the threshold level for retransmission. The power with which the relay retransmits the signal is proportional to the quality of the corresponding signal received at the relay. Upon receiving the signal corresponding to a particular mobile terminal, from one or more relays, the base station commands the mobile terminal to reduce the power with which it transmits until the signal received at the base station BS is just sufficient to meet the requirements of the transmission. As a result of the reduction in transmit power, the mobile terminal M may no longer be a member of the candidate sets of some of the relays. In this example, the reduction in signal power is sufficient for the signal transmitted by mobile M to fall below the threshold at relay R0 and consequently mobile M is dropped from relay R0's candidate set. Relays R1-R3 continue to receive and retransmit a signal from M. Hence, only the highest quality signals will be selected for retransmission. It will be seen that a mobile terminal will tend to form a cluster of relays around itself, all of which can receive high-quality signals from it. Some of these relays may be disadvantageously located with respect to communication with the base station, but this will not stop those relays from transmitting. In this example, relay R3 receives a strong signal from mobile M but is poorly positioned with respect to the base station BS, such as an area of deep fading. Consequently, it does not contribute a useful signal to the base station, but it may contribute interference 50 to other cells.

FIG. 11 shows the same example scenario as FIG. 10 but the base station now includes a beam-forming antenna array. Initially, the same set of relays receive the signal from M in the same manner, i.e. relays R1, R2 and R3 receive a signal from mobile terminal M at a high signal level, relay R0 receives the signal at a strength which is just above the threshold level for retransmission, and relay R4 receives the signal at a strength which is just below the threshold level for retransmission. As before, the power with which the relay retransmits the signal is proportional to the quality of the corresponding signal received at the relay. As before, base station BS commands the mobile terminal to reduce the power with which it transmits until the signal received at the base station BS is just sufficient to meet the requirements of the transmission. Relay R0 removes mobile terminal M from it's candidate set. During this initial stage of the process the base station BS forms an omni-directional beam. However, the base station BS now forms a beam 55, which may have a complex shape with multiple principal lobes 55A, 55B to maximise the received signal quality at the base station. This can be a shape with principal lobes 55A, 55B directed towards the strongest signals, i.e. those from relays R1 and R2. Higher quality (e.g. stronger) signals, which experience good propagation between the relay and the base station, will experience gain due to the antenna, whereas poor quality (e.g. weaker) signals subject to poor propagation between the relay and the base station will be attenuated. The overall quality of the received signal will be improved. The base station now commands the mobile terminal to further reduce the power with which it transmits until the signal received at the base station is just sufficient to meet requirements of the transmission. Because the antenna gain is preferentially directed to those relays providing a high-quality signal at the base station, their signals will be the dominant components of the received signal at the base station. The further reduction in transmit power of the mobile terminal will cause some of the signals received at the relays to no longer have the highest quality in their respective candidate set and therefore not to be chosen for retransmission. Furthermore, some may fall below the threshold and therefore not be included in the candidate set. In the example of FIG. 11 the increased gain of the antenna pattern 55 reduces the strength of the signal transmitted by mobile M, and hence reduces the strength of the signal transmitted by relay R3. The reduction in power reduces the effect of interfering transmission 50' on neighbouring cells. The reduction in transmission power at M may be sufficient to cause the signal from M to fall below the threshold at relay R3. In that case, mobile M is dropped from the candidate list of relay R3 and relay R3 ceases to cause interference with neighbouring cells. The net result of this improvement is to reduce the number of relays in the group corresponding to a particular mobile terminal and hence reduce the amount of interference produced. A conventional adaptive antenna and conventional techniques for controlling such an antenna to form a beam pattern in the manner just described can be used, which will be well understood by a skilled person. In the downlink direction, the base station BS can form a beam shape which is the same as that used for the uplink. While the examples given above describe only one relay equipment (12-16) in any given communication path between a source equipment and a destination equipment, the present invention is equally applicable where communication paths between a source equipment and a destination equipment extend via two or more such relay equipments.

The present invention provides an alternative to the use of link state protocols in order to take advantage of the significant advantages of a multi-hop cellular environment. Firstly, the signalling overhead associated with the operation of link state protocols can be avoided. Also, the present invention enables multiple signal paths to be present between a source equipment and a destination equipment. For example, a direct path may exist in addition to one or more indirect paths, all involving at least one relay equipment, with signals from all of these paths being combined at the destination equipment. This enables further advantage to be obtained from diversity gain obtained against slow and fast fading. In this respect space-time processing techniques may be employed, to increase capacity by exploiting Multiple Input Multiple Output (MIMO) channels.

It should be noted that the embodiments described above in relation to the Figures describe a relay that is capable of supporting a single uplink signal and a single downlink signal. It will be appreciated by those skilled in the art that a relay could be provisioned to support multiple uplink signals and multiple downlink signals without deviating from the spirit of the invention.

The invention claimed is:

1. A multi-hop wireless communications system comprising a plurality of relay equipments and a destination equipment, in which uplink signals may be relayed from at least one source equipment towards the destination equipment via at least one of said plurality of relay equipments, corresponding downlink signals may be relayed from the destination equipment towards the at least one source equipment via at least one of said plurality of relay equipments, and the destination equipment comprises an adaptive antenna array arranged to transmit said corresponding downlink signals, wherein each of said plurality of relay equipments measures the quality of uplink signals received from the at least one source equipment and measures the quality of downlink signals received at the relay equipment from the destination equipment and selects, based on the quality of the received uplink signals and the quality of the received downlink signals forming duplex communication with the uplink signals, an uplink signal to relay, and wherein, responsive to a determination of received signal strength of each selected uplink signal at the destination equipment, the adaptive antenna array is arranged to form a beam pattern, whereby to preferentially receive uplink signals from and preferentially transmit downlink signals towards at least one of said plurality of relay equipments that relays one of the selected uplink signals determined to have the strongest received signal strength at the destination equipment.

2. A communications system according to claim 1, wherein the at least one source equipment is an end user terminal and the destination equipment is a base station.

3. A communications system according to claim 1, wherein each of said plurality of relay equipments measures the quality of each uplink signal and each downlink signal it receives, compares the quality measured for each uplink signal to a threshold quality for that uplink signal and compares the quality measured for each downlink signal with a threshold quality for that downlink signal, and rejects any received uplink signals and any received downlink signals of a quality below the respective threshold.

4. A communications system according to claim 1, wherein each of said plurality of relay equipments measures the quality of each uplink signal it receives and selects the uplink signal having the best measured quality.

5. A communications system according to claim 1, wherein each of said plurality of relay equipments measures the quality of each uplink signal it receives, compares the quality measured for each uplink signal to a threshold quality for that signal, forms a candidate set of uplink signals comprising those received uplink signals having a quality above the threshold and selects one of the candidate set of uplink signals.

6. A communications system according to claim 1, wherein each of said plurality of relay equipments comprises a signal processor for measuring the quality of each uplink signal received from the at least one source equipment, for comparing the quality measured for each uplink signal to a threshold quality for that uplink signal, for forming a candidate set of uplink signals comprising those received uplink signals having a quality above the threshold, for measuring the quality of each downlink signal received from the destination equipment, for comparing the quality measured for each downlink signal to a downlink threshold quality for that downlink signal, for forming a candidate set of downlink signals comprising those received downlink signals having a quality above the downlink threshold and for selecting that uplink signal of the candidate set of uplink signals having the biggest difference between its measured quality and its threshold quality whose corresponding downlink signal is a member of the candidate set of downlink signals, wherein each of said plurality of relay equipments relays the selected uplink signal towards the destination equipment.

7. A communications system according to claim 1, wherein each of said plurality of relay equipments comprises a signal processor for measuring the quality of each downlink signal received from the destination equipment, comparing the quality measured for each downlink signal to a threshold quality for that downlink signal, for forming a candidate set of downlink signals comprising those received downlink signals having a quality above their associated thresholds, for forming a candidate set of uplink signals comprising those received uplink signals having a quality above their threshold and for selecting that downlink signal of the candidate set of downlink signals whose corresponding uplink signal is a member of the candidate set of uplink signals having the biggest difference between its measured quality and its threshold quality, wherein each of said plurality of relay equipments relays the selected downlink signal towards the at least one source equipment.

8. A communications system according to claim 1, wherein in relation to the selected uplink signal each of said plurality of relay equipments increases the power of the uplink signal it transmits relative to the uplink signal it receives by an amount dependent on the measured quality of the selected uplink signal.

9. A communication system according to claim 1, wherein each of said plurality of relay equipment is an end user equipment.

10. A communication system according to claim 1, comprising a power control arrangement according to which the power of the uplink signal transmitted by the at least one source equipment is dependent on a power control instruction received from the destination equipment.

11. A communications system according to claim 1, wherein the at least one source equipment is a base station and the destination equipment is an end user terminal.

12. A method in a multi-hop wireless communications system of relaying an uplink signal from at least one source equipment towards a destination equipment and relaying a corresponding downlink signal from the destination equipment to the at least one source equipment via at least one relay equipment, wherein the communications system comprises a plurality of relay equipments and the destination equipment, and the destination equipment comprises an adaptive antenna array, the method comprising the steps of:
  each of said plurality of relay equipments receiving a plurality of uplink signals from the at least one source equipment and receiving downlink signals from the destination equipment,
  each of said plurality of relay equipments measuring the quality of the uplink and downlink signals it receives and selecting, based on the quality of the received uplink signals and the quality of the received downlink signals forming duplex communication with the uplink signals, an uplink signal to relay; and
  using the adaptive antenna array at the destination equipment to form a beam pattern in response to a determination of received signal strength of each selected uplink signal at the destination equipment, whereby to preferentially receive uplink signals from and to preferentially transmit downlink signals towards one of the relay equipments that relays one of the selected uplink signals determined to have the strongest received signal strength at the destination equipment.

13. A method according to claim 12, wherein the source equipment is an end user terminal and the destination equipment is a base station.

14. A method according to claim 12, comprising the steps of, each of said plurality of relay equipments:
  measuring the quality of each uplink signal it receives;
  comparing the quality measured for each uplink signal to a threshold quality for that uplink signal; and
    rejecting those received uplink signals of a quality below the threshold.

15. A method according to claim 12, comprising the steps of, each of said plurality of relay equipments:
  measuring the quality of each uplink signal it receives; and
  selecting the uplink signal having the best measured quality.

16. A method according to claim 12, comprising the steps of, each of said plurality of relay equipments:
  measuring the quality of each uplink signal it receives;
  comparing the quality measured for each uplink signal to a threshold quality for that uplink signal;
  forming a candidate set of uplink signals comprising those received uplink signals having a quality above the respective threshold; and
  selecting an uplink signal from the candidate set of uplink signals.

17. A method according to claim 12, comprising the steps of, each of said plurality of relay equipments:
  measuring the quality of each uplink signal it receives from the at least one source equipment;
  comparing the quality measured for each uplink signal to a threshold quality for that uplink signal;
  forming a candidate set of uplink signals comprising those received uplink signals having a quality above the threshold;
  measuring the quality of each downlink signal it receives from the destination equipment;
  comparing the quality measured for each downlink signal to a downlink threshold quality for that downlink signal;
  forming a candidate set of downlink signals comprising those received downlink signals having a quality above their thresholds;
  selecting that uplink signal of the candidate set of uplink signals having the biggest difference between its measured quality and its threshold quality whose corresponding downlink signal is a member of the candidate set of downlink signals; and
  relaying that selected uplink signal towards the destination equipment.

18. A method according to claim 12, comprising the steps of, each of said plurality of relay equipments:
  measuring the quality of each downlink signal it receives from the destination equipment;
  comparing the quality measured for each downlink signal to a threshold quality for that downlink signal;
  forming a candidate set of downlink signals comprising those received downlink signals having a quality above the threshold;
  forming a candidate set of uplink signals received from the at least one source equipment having a quality above their threshold;
  selecting that downlink signal of the candidate set of downlink signals whose corresponding uplink signal is a member of the candidate set of uplink signals having the biggest difference between its measured quality and its threshold quality; and
  relaying that selected downlink signal towards the destination equipment.

19. A method according to claim 12, comprising the additional step of each of said plurality of relay equipments, in relation to the selected uplink signal, increasing the power of the uplink signal it transmits relative to the uplink signal it receives by an amount dependent on the measured quality of the selected uplink signal.

20. A method according to claim 12, comprising making the power of the uplink signal transmitted by the at least one source equipment dependent on a power control instruction received from the destination equipment.

21. A method according to claim 12, wherein the at least one source equipment is a base station and the destination equipment is an end user terminal.

* * * * *